(12) United States Patent
Muraoka et al.

(10) Patent No.: US 10,511,976 B2
(45) Date of Patent: Dec. 17, 2019

(54) METHOD AND APPARATUS FOR RADIO COMMUNICATION

(71) Applicant: NEC Corporation, Tokyo (JP)

(72) Inventors: Kazushi Muraoka, Tokyo (JP); Taichi Ohtsuji, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 15/740,676

(22) PCT Filed: Mar. 11, 2016

(86) PCT No.: PCT/JP2016/001367
§ 371 (c)(1),
(2) Date: Dec. 28, 2017

(87) PCT Pub. No.: WO2017/002282
PCT Pub. Date: Jan. 5, 2017

(65) Prior Publication Data
US 2018/0199206 A1 Jul. 12, 2018

(30) Foreign Application Priority Data

Jun. 29, 2015 (JP) ................. 2015-130460

(51) Int. Cl.
*H04W 16/14* (2009.01)
*H04L 5/00* (2006.01)

(52) U.S. Cl.
CPC .......... *H04W 16/14* (2013.01); *H04L 5/0028* (2013.01); *H04L 5/0092* (2013.01)

(58) Field of Classification Search
CPC .... H04L 5/0028; H04L 5/0092; H04W 16/14; H04W 72/02; H04W 92/18
See application file for complete search history.

(56) References Cited

U.S. PATENT DOCUMENTS

2016/0128093 A1 5/2016 Lee et al.

OTHER PUBLICATIONS

Samsung, Clarification on power control for D2D and WAN CA [online], 3GPP TSG-RAN WG1#80 RI-150708, Internet<URL:http://www.3gpp.org/ftp/ tsg ran/WGI RL1/TSGRI 80/0ocs/RI-150708.zip>, Feb. 13, 2015 (5 pgs).

(Continued)

*Primary Examiner* — Gbemileke J Onamuti
(74) *Attorney, Agent, or Firm* — Wilmer Cutler Pickering Hale and Dorr LLP

(57) ABSTRACT

A radio terminal (1) selects, from a resource pool in a discovery period, $N^{TX}$ sets of resource blocks for $N^{TX}$ transmissions of a discovery signal based on a first value n1 that is a resource value autonomously selected by the radio terminal (1) or is a parameter received from a base station (2). A frequency domain shift from a second resource block set used in (j−1)th transmission (j is an integer no less than 2) to a first resource block set used in j-th transmission of the discovery signal in the discovery period depends on at least one of the first value n1 and a frequency domain position of the second resource block set in the resource pool. It is thus, for example, possible to attenuate decline in reception quality of a discovery signal due to interference resulting from In-Band Emissions (IBE) when direct discovery of D2D communication is performed.

20 Claims, 9 Drawing Sheets

(56) References Cited

OTHER PUBLICATIONS

3GPP TS23.303 V12.4.0 "3rd Generation Partnership Project; Technical Specification Group Services and System Aspects; Proximity-based services (ProSe); State 2 (Release 12)," Mar. 2015 (63 pages).
3GPP TS 36.213 V12.5.0 "3rd Generation Partnership Project; Technical Specification Group Radio Access Network; Evolved Universal Terrestrial Radio Access (E-UTRA); Physical layer procedures (Release 12)," Mar. 2015 (239 pages).
International Search Report corresponding to PCT/JP2016/001367, dated May 31, 2016 (3 total pages).

METHOD AND APPARATUS FOR RADIO COMMUNICATION

CROSS REFERENCE TO RELATED APPLICATIONS

This application is a national stage application of International Application No. PCT/JP2016/001367 entitled "METHOD AND APPARATUS FOR RADIO COMMUNICATION", filed on Mar. 11, 2016, which claims the benefit of the priority of Japanese Patent Application No. 2015-130460, filed on Jun. 29, 2015, the disclosures of each of which are hereby incorporated by reference in their entirety.

TECHNICAL FIELD

The present disclosure relates to inter-terminal direct communication (i.e., device-to-device (D2D) communication) and, in particular, to transmission of a discovery signal.

BACKGROUND ART

A form of communication in which a radio terminal directly communicates with another radio terminal without communicating through an infrastructure network such as a base station is called device-to-device (D2D) communication. The D2D communication includes at least one of Direct Communication and Direct Discovery. In some implementations, a plurality of radio terminals supporting D2D communication form a D2D communication group autonomously or under the control of a network, and perform communication with another radio terminal in the formed D2D communication group.

Proximity-based services (ProSe) specified in 3GPP Release 12 are examples of the D2D communication (see, for example, Non-patent Literature 1). ProSe direct discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. ProSe direct discovery may be performed by three or more ProSe-enabled UEs.

ProSe direct communication enables establishment of a communication path between two or more ProSe-enabled UEs existing in a direct communication range after the ProSe discovery procedure is performed. In other words, ProSe direct communication enables a ProSe-enabled UE to directly communicate with another ProSe-enabled UE, without communicating through a Public Land Mobile Network (PLMN) including a base station (eNodeB). ProSe direct communication may be performed by using a radio communication technology that is also used to access a base station (eNodeB) (i.e., E-UTRA technology) or by using a Wireless Local Area Network (WLAN) radio technology (i.e., IEEE 802.11 radio technology).

In 3GPP Release 12, a radio link between radio terminals used for direct communication or direct discovery is called a Sidelink (see, for example, Section 14 of Non-patent Literature 2). Sidelink transmission uses the Long Term Evolution (LTE) frame structure defined for an uplink and a downlink and uses a subset of uplink resources in frequency and time domains. A radio terminal (i.e., UE) performs sidelink transmission by using Single Carrier FDMA (Frequency Division Multiple Access) (SC-FDMA) similar to that for the uplink.

In 3GPP Release 12 ProSe, allocation of a radio resource for sidelink transmission to a UE is performed by a radio access network (e.g., Evolved Universal Terrestrial Radio Access Network (E-UTRAN)). A UE that has been permitted to perform sidelink transmission by a ProSe function performs ProSe direct discovery or ProSe direct communication by using a radio resource allocated by a radio access network node (e.g., eNodeB (an eNB)).

Regarding ProSe direct discovery, two resource allocation modes, i.e., autonomous resource selection and scheduled resource allocation are specified. The autonomous resource selection and the scheduled resource allocation are referred to as "sidelink discovery Type 1" and "sidelink discovery Type 2", respectively.

In the autonomous resource selection for ProSe direct discovery (i.e., sidelink discovery Type 1), a UE that desires transmission (announcing) of a discovery signal (i.e., Physical Sidelink Shared Channel (PSDCH)) autonomously selects radio resources from a resource pool.

In the scheduled resource allocation for ProSe direct discovery (i.e., sidelink discovery Type 2), a UE requests an eNodeB to allocate resources for announcement via RRC signaling. The eNodeB allocates resources for announcement selected from a resource pool to the UE. When the scheduled resource allocation is used, the eNodeB indicates in a System Information Block (SIB 19) that it provides resources for monitoring of ProSe direct discovery but does not provide resources for announcement.

A resource pool for ProSe direct discovery is referred to as a discovery resource pool and is configured in UEs by an eNB via broadcast (SIB 19) or dedicated signaling (RRC signaling). The discovery resource pool consists of $L_{PSDCH}$ subframes and $M^{PSDCH\_RB}$ frequency domain resource blocks in a discovery period. The discovery period is also referred to as a PSDCH period.

A method for designating a discovery resource pool is described with reference to FIG. 1. The discovery resource pool consists of a subframe pool and a resource block pool. To indicate the subframe pool, the eNB specifies the length (P) of a discovery period, the number ($N_R$) of repetitions of a subframe bitmap in the discovery period, and the subframe bitmap and its length ($N_B$).

The length (P) of the discovery period is 32, 64, 128, 256, 512, or 1024 radio frames. In 3GPP Release 12 (LTE-advanced), one radio frame has a length of 10 milliseconds and consists of 10 subframes. The length of one subframe is 1 millisecond. Therefore, the length (P) of the discovery period is 320, 640, 1280, 2560, 5120, or 10240 subframes.

The length ($N_B$) of the subframe bitmap is 4, 8, 12, 16, 30, 40, or 42 bits. The subframe bitmap indicates that subframes corresponding to bits in each of which "0" is set are not used for the discovery and subframes corresponding to bits in each of which "1" is set can be used for the discovery.

The maximum value for the number ($N_R$) of repetitions of the subframe bitmap in a discovery period depends on a duplex mode, i.e., frequency division duplex (FDD) or time division duplex (TDD) and, in TDD, also depends on a UL/DL configuration. Specifically, the maximum value for the number ($N_R$) of repetitions is 5 for FDD and TDD UL/DL configuration 0, 13 for TDD UL/DL configuration 1, 25 for TDD UL/DL configuration 2, 17 for TDD UL/DL configuration 3, 25 for TDD UL/DL configuration 4, 50 for TDD UL/DL configuration 5, or 7 for TDD UL/DL configuration 6.

Therefore, the number ($L_{PSDCH}$) of subframes included in the discovery resource pool corresponding to one discovery period is obtained by multiplying the number of bits in each of which a value "1" is set in the subframe bitmap by the number ($N_R$) of repetitions. In the example shown in FIG. 1, the length ($N_B$) of the subframe bitmap is 8 bits and the number ($N_R$) of repetitions is 4. Further, among the 8 bits in the subframe bitmap, 4 bits are set as usable (i.e., value "1") (hatched subframes in FIG. 1). Therefore, the number ($L_{PSDCH}$) of subframes included in the discovery resource pool is 16.

Meanwhile, to indicate the resource block pool, the eNB specifies an index (S1) of a start Physical Resource Block (PRB), an index (S2) of an end PRB, and the number (M) of PRBs. The resource block pool includes M PRBs whose PRB indexes q are equal to or greater than the start index (S1) and less than S1+M (i.e., S1<=q<S1+M) and M PRBs whose PRB indexes q are greater than S2−M and equal to or less than the end index (S2) (i.e., S2−M<q<=S2) (that is, the resource block pool includes 2M PRBs in total). In other words, the eNB can designate two PRB clusters each of which includes M PRBs as the discovery resource pool.

FIG. 2 shows an example of the discovery resource pool in one discovery period. In the example shown in FIG. 2, the number ($L_{PSDCH}$) of subframes included in the discovery resource pool is 16. The subframes included in the discovery resource pool (i.e., subframe pool) can be expressed as follows:

$$(l_0^{PSDCH}, l_1^{PSDCH}, \ldots, l_{L_{PSDCH}-1}^{PSDCH}).$$

Further, in the example shown in FIG. 2, the number ($M_{RB}^{PSDCH\_RP}$) of resource blocks (PRBs) included in the discovery resource pool is 16. The resource blocks included in the discovery resource pool (i.e., the resource block pool) can be expressed as follows:

$$(m_0^{PSDCH}, m_1^{PSDCH}, \ldots, m_{M_{RB}^{PSDCH\_RP}-1}^{PSDCH}).$$

In this specification, several figures similar to FIG. 2 are used to shows a discovery resource pool in one discovery period. However, in view of the above, it should be noted that a plurality of subframes included in one discovery resource pool may not be temporally contiguous. Further, resource blocks included in one discovery resource pool include two clusters.

Next, radio resource allocation for transmission of a discovery signal (i.e., PSDCH) specified in 3GPP Release 12 will be described. Details of the radio resource allocation are described in detail in Section 14.3 of Non-patent Literature 2. As already described, two different methods, i.e., sidelink discovery Type 1 and Type 2 are specified for radio resource allocation for transmission of a discovery signal (PSDCH). In the Sidelink discovery Type 1, radio resources are allocated on a non-UE specific basis. In contrast to this, in the Sidelink discovery Type 2, radio resources are allocated on a UE specific basis. Note that regarding the Type 2, though two types, i.e., Type 2A and Type 2B had been discussed, only Type 2B is specified in the current Release 12. In Type 2B, an eNB allocates radio resources for transmission of a discovery signal (PSDCH) to a UE in a semi-persistent manner. In contrast to this, in Type 2A, which is not specified in the current Release 12, an eNB allocates radio resources for transmission of a discovery signal (PSDCH) dynamically to a UE in each discovery period (i.e., PSDCH period).

The following provides a description about allocation of resources in the Sidelink discovery Type 1. In the Sidelink discovery Type 1, a UE autonomously selects a resource value $n_{PSDCH}$ and determines subframes and resource blocks for PSDCH transmission as follows.

The number of transmissions of a transport block on PSDCH in an i-th PSDCH period is $N_{SLD}^{TX}=n+1$ where n is given by the higher layer parameter "discoveryNumRetx". The parameter discoveryNumRetx is configured in the UE by the eNB by using, for example, dedicated signaling (e.g., RRC Connection Reconfiguration).

The allowed resource values $n_{PSDCH}$ from which the UE can select are integers from 0 to ($N_t*N_f-1$), where $N_t$ and $N_f$ are defined as follows:

$$N_t = \lfloor L_{PSDCH}/N_{SLD}^{TX} \rfloor,$$

$$N_f = \lfloor M_{RB}^{PSDCH\_RP}/2 \rfloor.$$

The j-th transmission for a discovery signal (i.e., the transport block on the PSDCH) in the discovery period occurs in the subframe $$l_{N_{SLD} \cdot b_1 + j - 1}^{PSDCH}$$

among $L_{PSDCH}$ subframes (i.e., $l_0^{PSDCH}, l_1^{PSDCH}, \ldots, l_{L\_PSDCH-1}^{PSDCH}$) in the discovery resource pool and uses two contiguous resource blocks $$m_{2 \cdot a_j}^{PSDCH} \text{ and } m_{2 \cdot a_j + 1}^{PSDCH}$$

of the above-shown subframe, where $$a_j = ((j-1) \cdot \lfloor N_f/N_{SLD}^{TX} \rfloor + \lfloor n_{PSDCH}/N_t \rfloor) \bmod N_f,$$

$$b_1 = n_{PSDCH} \bmod N_t.$$

FIG. 3 shows an example of radio resource allocation based on the Sidelink discovery Type 1 when $L^{PSDCH}=16$, $M_{RB}^{PSDCH\_RP}=16$, and $N_{SLD}^{TX}=4$. A numerical value in each cell shown in FIG. 3 indicates a value of the resource value $n_{PSDCH}$ that a UE can select. For example, when $n_{PSDCH}=0$, PSDCH transmission is performed four times in the first, second, third, and fourth subframes $l_0^{PSDCH}$, $l_1^{PSDCH}$, $l_2^{PSDCH}$, and $l_3^{PSDCH}$ in the discovery resource pool. Similarly to this, when $n_{PSDCH}=4$, PSDCH transmission is also performed four times in the first, second, third, and fourth subframes $l_0^{PSDCH}$, $l_1^{PSDCH}$, $l_2^{PSDCH}$, and $l_3^{PSDCH}$ in the discovery resource pool.

CITATION LIST

Non Patent Literature

Non-patent Literature 1: 3GPP TS 23.303 V12.4.0 (March 2015), "3rd Generation Partnership Project; Technical Specification Group Services and System Aspects; Proximity-based services (ProSe); Stage 2 (Release 12)", March 2015

Non-patent Literature 2: 3GPP TS 36.213 V12.5.0 (March 2015), "3rd Generation Partnership Project; Technical Specification Group Radio Access Network; Evolved Universal Terrestrial Radio Access (E-UTRA); Physical layer procedures (Release 12)", March 2015

SUMMARY OF INVENTION

Technical Problem

As understood from FIG. 3, in the Sidelink discovery Type 1 specified in 3GPP Release 12, regarding some of $N_t*N_f$ resource values $n_{PSDCH}$ ($0<=n_{PSDCH}<=N_t*N_f-1$) that a UE can arbitrarily select, $N_{SLD}^{TX}$ times of PSDCH transmission in the discovery period are performed in the completely same set of subframes. For example, in the example shown in FIG. 3, when the resource values $n_{PSDCH}$ are 0, 4, 8, 12, 16, 24 and 28, PSDCH transmissions are performed four times in the subframes $l_0^{SPDCH}$, $l_1^{PSDCH}$, $l_2^{PSDCH}$ and $l_3^{PSDCH}$.

Further, when the number j is two or greater, resource blocks used in j-th PSDCH transmission are cyclically-shifted from resource blocks used in (j−1)th transmission by a fixed value, i.e., by $$2\cdot\lfloor N_f/N_{SLD}^{TX}\rfloor$$

in the frequency domain. To put it differently, a value of a frequency domain shift from resource blocks used in (j−1)th PSDCH transmission to resource blocks used in the j-th transmission does not depend on either the value of the resource value $n_{PSDCH}$ selected by the UE nor the resource blocks used in the (j−1)th PSDCH transmission. Therefore, in the case of the example shown in FIG. 3, all of the resource blocks used in the four times of PSDCH transmission in which the resource value $n_{PSDCH}$ is zero ($n_{PSDCH}=0$) are adjacent to the resource blocks used in the PSDCH transmissions in which the resource value $n_{PSDCH}$ is four ($n_{PSDCH}=4$). The above-described radio resource allocation could cause interference in a frequency domain due to In-Band Emissions (IBE) as described below.

In general, it has been known that transmission performed by a UE causes interference in a frequency domain to unallocated resource blocks (subcarriers) due to In-Band Emissions (IBE). Therefore, interference resulting from IBE may occur when a plurality of D2D transmissions are simultaneously performed in close proximity to each other. Further, according to radio resource allocation in the Sidelink discovery Type 1 specified in 3GPP Release 12, for example, a UE that has selected a resource value $n_{PSDCH}=0$ and another UE that has selected a resource value $n_{PSDCH}=4$ transmit their discovery signals (PSDCH) in completely the same subframes and in adjacent resource blocks, and thus In-band interference due to IBE may become more serious. For example, as shown in FIG. 4, assume a case in which when a monitoring UE 401 is attempting to monitor a discovery signal (i.e., a desired signal) transmitted from an announcing UE 402, another announcing UE 403 transmits a discovery signal (i.e., a non-desired signal) near the monitoring UE 401. If the value $n_{PSDCH}$ selected by the announcing UE 402 is "0" and the value $n_{PSDCH}$ selected by the announcing UE 403 is "4", these two announcing UEs 402 and 403 not only transmit their discovery signals in completely the same set of subframes but also perform all of these transmissions by using adjacent resource blocks. Therefore, reception quality in the monitoring UE 401 of the discovery signal (the desired signal) from the announcing UE 402 may decrease due to In-band interference.

Note that the above-described problem is not limited to the Sidelink discovery Type 1 but may also occur in radio resource allocation in accordance with the Sidelink discovery Type 2B. In the Sidelink discovery Type 2B, a subframe and resource blocks in which the first transmission in the discovery period occurs are determined based on three parameters $N_{PSDCH}^{(1)}$, $N_{PSDCH}^{(2)}$, and $N_{PSDCH}^{(3)}$ given to an UE by the eNB using the PSDCH resource configuration. However, UEs that use different resource block pairs of the same subframes in the first PSDCH transmission also use the same subframes and resource block pairs having the same adjacent relation in the subsequent second to $N_{SLD}^{TX}$-th transmissions. Therefore, the above-described interference caused by IBE may also be serious in the Sidelink discovery Type 2B specified in 3GPP Release 12.

One of the objects to be attained by embodiments disclosed in this specification is to provide an apparatus, a method, and a program that contribute to attenuating decline in reception quality of a discovery signal due to interference resulting from IBE when direct discovery of D2D communication is performed.

Solution to Problem

In a first aspect, a method for radio communication performed in a radio terminal includes selecting, from a resource pool including L subframes and M frequency domain resource blocks in a discovery period, $N^{TX}$ subframes and $N^{TX}$ sets of resource blocks to be used in $N^{TX}$ times of transmission of a discovery signal in the discovery period based on a first value n1 of a resource value autonomously selected by the radio terminal or a first value n1 of a parameter received from a base station. Each set of the $N^{TX}$ sets of resource blocks is used in transmission of the discovery signal in a respective one of the $N^{TX}$ subframes. With regard to the $N^{TX}$ sets of resource blocks, a value of a frequency domain shift from a second resource block set used in (j−1)th transmission to a first resource block set used in j-th transmission of the discovery signal in the discovery period depends on at least one of the first value n1 and a frequency domain position of the second resource block set in the resource pool, where j is an integer equal to or greater than 2.

In a second aspect, a radio terminal includes at least one radio transceiver and at least one processor. The at least one processor is configured to perform cellular communication with a cellular network and device-to-device communication with another radio terminal by using the at least one radio transceiver. The at least one processor is further configured to select, from a resource pool including L subframes and M frequency domain resource blocks in a discovery period, $N^{TX}$ subframes and $N^{TX}$ sets of resource blocks to be used in $N^{TX}$ times of transmission of a discovery signal in the discovery period based on a first value n1 of a resource value autonomously selected by the radio terminal or a first value n1 of a parameter received from a base station. Each set of the $N^{TX}$ sets of resource blocks is used in transmission of the discovery signal in a respective one of the $N^{TX}$ subframes. With regard to the $N^{TX}$ sets of resource blocks, a value of a frequency domain shift from a second resource block set used in (j−1)th transmission to a first resource block set used in j-th transmission of the discovery signal in the discovery period depends on at least one of the first value n1 and a frequency domain position of the second resource block set in the resource pool, where j is an integer equal to or greater than 2.

In a third aspect, a program includes a set of instructions (software codes) that, when loaded into a computer, causes the computer to perform a method according to the above-described first aspect.

Advantageous Effects of Invention

According to the above-described aspects, it is possible to provide an apparatus, a method, and a program that contribute to attenuating decline in reception quality of a discovery signal due to interference resulting from IBE when direct discovery of D2D communication is performed.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

The following embodiments will be described on the assumption that they are implemented to improve ProSe specified in 3GPP Release 12 (LTE-Advanced). However, these embodiments are not limited to the LTE-Advanced and its improvements and may also be applied to D2D communication in other mobile communication networks or systems.

First Embodiment

Figure 5:
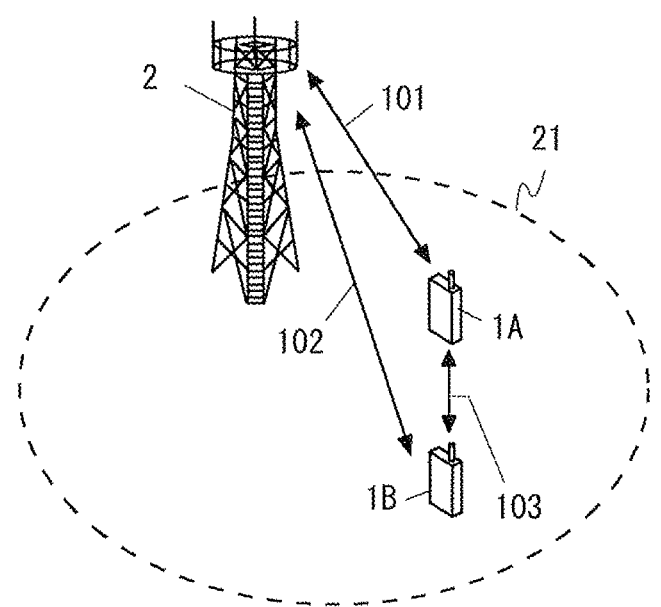
FIG. 5 shows a configuration example of a radio communication system according to some embodiments.

FIG. 5 shows a configuration example of a radio communication system according to some embodiments including this embodiment. Each of UEs 1A and 1B includes at least one radio transceiver and is configured to perform cellular communication (101 or 102) with a base station 2 and D2D communication on an inter-terminal direct interface (e.g., a PC5 interface of a sidelink) 103. This D2D communication includes at least direct discovery (e.g., ProSe Direct Discovery) and may further include direct communication (ProSe Direct Communication). The eNB 2 manages a cell 21 and is able to perform cellular communication (101 and 102) with each of the plurality of UEs 1 by using a cellular communication technology (e.g., an Evolved Universal Terrestrial Radio Access (E-UTRA) technology). Although the example of FIG. 5 indicates an arrangement where the UEs 1A and 1B are located in the same cell 21 for simplifying the description, this arrangement is merely an example. For example, the UE 1A may be located in one of two cells that are adjacent to each other and are managed by different eNBs 2, and the UE 1B may be located in the other one of the two cells. Alternatively, at least one of the UEs 1A and 1B may be located outside the coverage of one or more eNBs 2.

The UE 1 is configured to select $N^{TX}_{SLD}$ subframes and $N^{TX}_{SLD}$ sets of resource blocks for $N^{TX}_{SLD}$ times of transmission of a discovery signal in a discovery period (a PSDCH period) from a resource pool consisting of $L_{PSDCH}$ subframes and $M^{PSDCH\_RP}_{RB}$ frequency domain resource blocks in the discovery period. Each set of the selected $N^{TX}_{SLD}$ sets of resource blocks is used in transmission of the discovery signal in a respective one of the selected $N^{TX}_{SLD}$ subframes. As already described, in 3GPP Release 12, each set of the $N^{TX}_{SLD}$ sets of resource blocks consists of two contiguous resource blocks.

In the case of the sidelink discovery Type 1 (i.e., the autonomous resource selection), the UE 1 may select $N^{TX}_{SLD}$ subframes and $N^{TX}_{SLD}$ sets of resource blocks based on a resource value $n_{PSDCH}$ that is autonomously selected by the UE 1. In contrast to this, in the case of the sidelink discovery Type 2B (i.e., the scheduled resource allocation), the UE 1 may receive a PSDCH resource configuration including one or more parameters (e.g., $N_{PSDCH}^{(1)}$, $N_{PSDCH}^{(2)}$ and $N_{PSDCH}^{(3)}$) from the eNB 2 and select $N^{TX}_{SLD}$ subframes and $N^{TX}_{SLD}$ sets of resource blocks based on at least one of the received one or more parameters.

Figure 6:
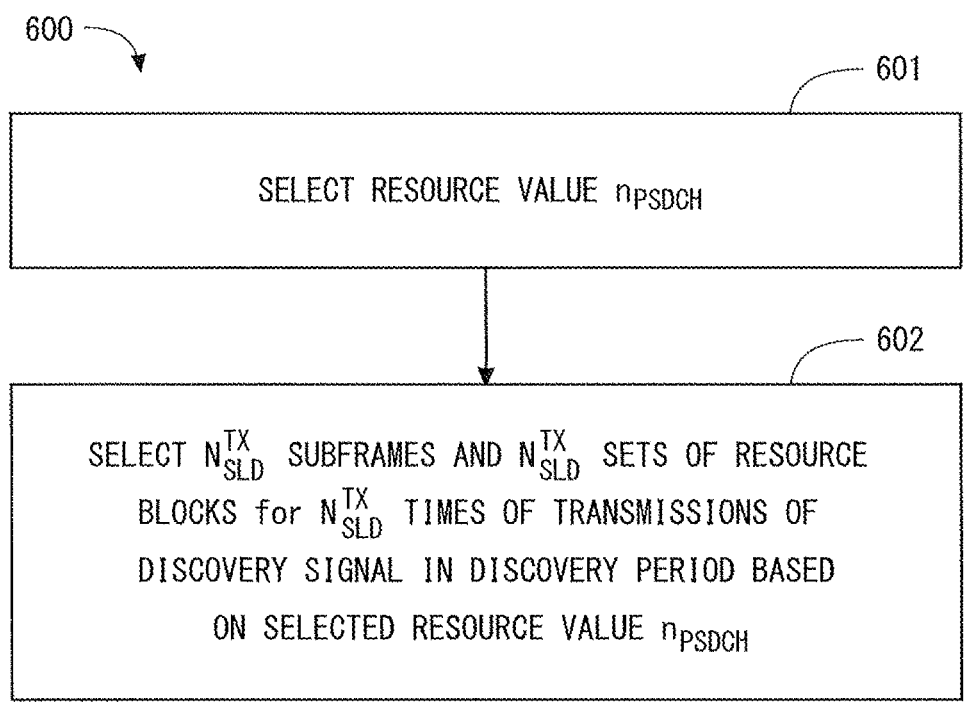
FIG. 6 is a flowchart showing an example of an operation performed by a radio terminal according to a first embodiment.

FIG. 6 shows a flowchart showing an example (a process 600) performed by the UE 1 when it selects a radio resource for direct discovery. Note that FIG. 6 shows a case of the sidelink discovery Type 1 (the autonomous resource selection). In block 601, the UE 1 autonomously selects a resource value $n_{PSDCH}$. In block 602, the UE 1 selects $N_{SLD}^{TX}$ subframes and $N^{TX}_{SLD}$ sets of resource blocks for $N_{SLD}^{TX}$ times of transmission of the discovery signal (i.e., PSDCH) in the discovery period (i.e., PSDCH period) based on the selected resource value $n_{PSDCH}$. Each set of the $N^{TX}_{SLD}$ sets of resource blocks is used in transmission of the discovery signal in a respective one of the $N^{TX}_{SLD}$ subframes.

According to a rule or algorithm used by the UE 1 to select subframes in block 602, a value of a frequency domain shift from a second resource block set used in the (j−1)th transmission (where j is an integer no less than 2) to a first resource block set used in the j-th transmission of the discovery signal in the discovery period is determined as follows. That is, the value of the frequency domain shift is determined depending on at least one of: (a) a value of the resource value $n_{PSDCH}$ selected by the UE 1; and (b) the frequency domain position of the second resource block set, which is used in the (j−1)th transmission, in the discovery resource pool.

To put it differently, in some implementations, the value of the frequency domain shift between the first resource block set used in j-th PSDCH transmission (where j is an integer equal to or greater than 2) and the second resource block set used in the (j−1)th PSDCH transmission performed by the UE 1 changes depending on whether the resource value $n_{PSDCH}$ selected by the UE 1 has a first value or a second value.

Alternatively, in some implementations, the value of the frequency domain shift between the first resource block set used in the j-th PSDCH transmission (where j is an integer equal to or greater than 2) and the second resource block set used in the (j−1)th PSDCH transmission performed by the UE 1 changes depending on whether the frequency domain position of the second resource block set in the discovery resource pool is a first position or a second position.

Note that the expression "a frequency domain position in a discovery resource pool" means a position in a logical order of a resource block of interest or a resource block set of interest (i.e., two contiguous resource blocks) in the discovery resource pool (i.e., resource block pool). For example, "a frequency domain position in a discovery resource pool" may be expressed by one of the logical serial numbers 0, 1, ..., ($M_{RB}^{PSDCH\_RP}/2-1$) assigned respectively to $M_{RB}^{PSDCH\_RP}/2$ resource block sets within the discovery resource pool.

As understood from the above explanation, in this embodiment, the value of the frequency domain shift from the resource block set used in the (j−1)th PSDCH transmission (1<j) to the resource block set used in the j-th PSDCH transmission performed by the UE 1 depends on either or both of the value of the resource value $n_{PSDCH}$ selected by the UE 1 and the resource block set used in the (j−1)th PSDCH transmission. This feature enables two UEs 1 to use mutually different frequency domain shift values when these UEs transmit their discovery signals in the same $N_{SLD}^{TX}$ subframes based on different resource values $n_{PSDCH}$. Therefore, it is possible to avoid a situation in which these two UEs 1 perform $N_{SLD}^{TX}$ times of PSDCH transmissions in the same set of subframes by using two resource block sets having the same adjacent relation. As a result, even when these two UEs 1 are close to each other, it is possible to prevent a situation in which strong interference caused by IBE from one of the UEs 1 occurs in every one of $N_{SLD}^{TX}$ transmissions of the discovery signal (PSDCH) performed by the other UE 1. This is because although these two UEs 1 may use two resource block sets that are closest to each other in some of the $N_{SLD}^{TX}$ transmissions performed by them, they use two resource block sets that are spaced apart from each other in the frequency domain in some of the other transmissions.

The following provides some specific examples of a radio resource selection for direct discovery according to this embodiment. In some implementations, in the subframe selecting rule or algorithm in block 602, the value of the frequency domain shift from the second resource block set used in the (j−1)th PSDCH transmission (1<j) to the first resource block set used in the j-th PSDCH transmission performed by the UE 1 may be determined depending on a serial number (i.e., 0, 1, ..., ($M_{RB}^{PSDCH\_RP}/2-1$)) indicating the frequency domain position of the second resource block set.

A first example of mapping between resource values $n_{PSDCH}$ and radio resources will be described. In the first example, the value of the frequency domain shift from the second resource block set used in the (j−1)th PSDCH transmission (1<j) to the first resource block set used in the j-th PSDCH transmission performed by the UE 1 changes depending on whether the serial number (i.e., 0, 1, ..., ($M_{RB}^{PSDCH\_RP}/2-1$)) indicating the frequency domain position of the second resource block set is an odd number or an even number.

Similarly to 3GPP Release 12, the allowed resource values $n_{PSDCH}$ from which the UE 1 can select are integers from 0 to ($N_t * N_f - 1$), where $N_t$ and $N_f$ are defined as follows:

$$N_t = \lfloor L_{PSDCH}/N_{SLD}^{TX} \rfloor,$$

$$N_f = \lfloor M_{RB}^{PSDCH\_RP}/2 \rfloor.$$

Further, the selection of $N_{SLD}^{TX}$ subframes may be similar to that in the sidelink discovery Type 1 of 3GPP Release 12. That is, when the UE 1 is configured to transmit a PSDCH in the i-th PSDCH period, the j-th transmission (j is no less than 1 and no greater than $N_{SLD}^{TX}$) of a transport block on the PSDCH occurs in the subframe $$l_{N_{SLD}^{TX} \cdot b_1 + j-1}^{PSDCH}$$

among LPSDCH subframes ($l_0, l_1, \ldots l_{L\_PSDCH-1}$) in the discovery resource pool and uses two contiguous resource blocks $$m_{2 \cdot a_j}^{PSDCH} \text{ and } m_{2 \cdot a_j+1}^{PSDCH}$$

of the above-shown subframe, where $$a_1 = \lfloor n_{PSDCH}/N_t \rfloor \text{ for } j = 1$$

$$a_j = \begin{cases} (a_{j-1}-1)/2 & \text{when } a_{j-1} \text{ is an odd number} \\ a_{j-1}/2 + N_f & \text{when } a_{j-1} \text{ is an even number} \end{cases} \text{ for } 1 < j < N_{SLD}^{TX}$$

$$b_1 = n_{PSDCH} \bmod N_t.$$

That is, in the first example of the mapping between resource values $n_{PSDCH}$ and radio resources, when the value of $a_{j-1}$ is an even number, $a_j$ is determined as a sum of a fixed shift value Nf and a value $a_{j-1}/2$ that is a value according to the value of $a_{j-1}$. Note that, $a_{j-1}$ indicates the frequency domain position of the resource block set (i.e., two contiguous resource blocks) used for the (j−1)th PSDCH transmission. Similarly, $a_j$ indicates the frequency domain position of the resource block set (i.e., two contiguous resource blocks) to be used for the j-th PSDCH transmission. In contrast to this, when the value of $a_{j-1}$ is an odd number, $a_j$ is determined by a value $(a_{j-1}-1)/2$ that is a value according to the value of $a_{j-1}$.

Figure 3:
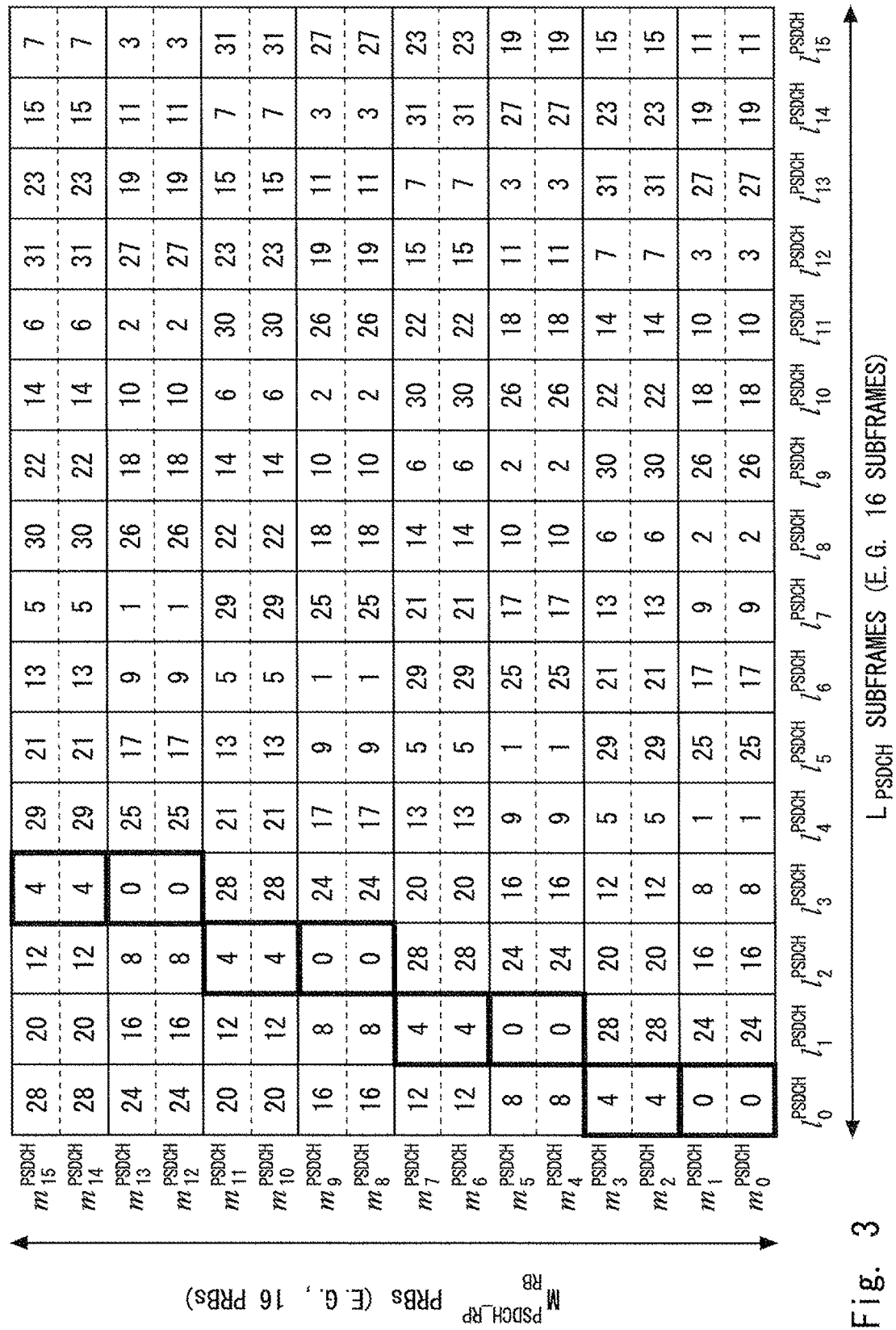
FIG. 3 shows an example of a selection of subframes and resource blocks for transmission of a discovery signal (PSDCH) in accordance with 3GPP Release 12.
Figure 4:
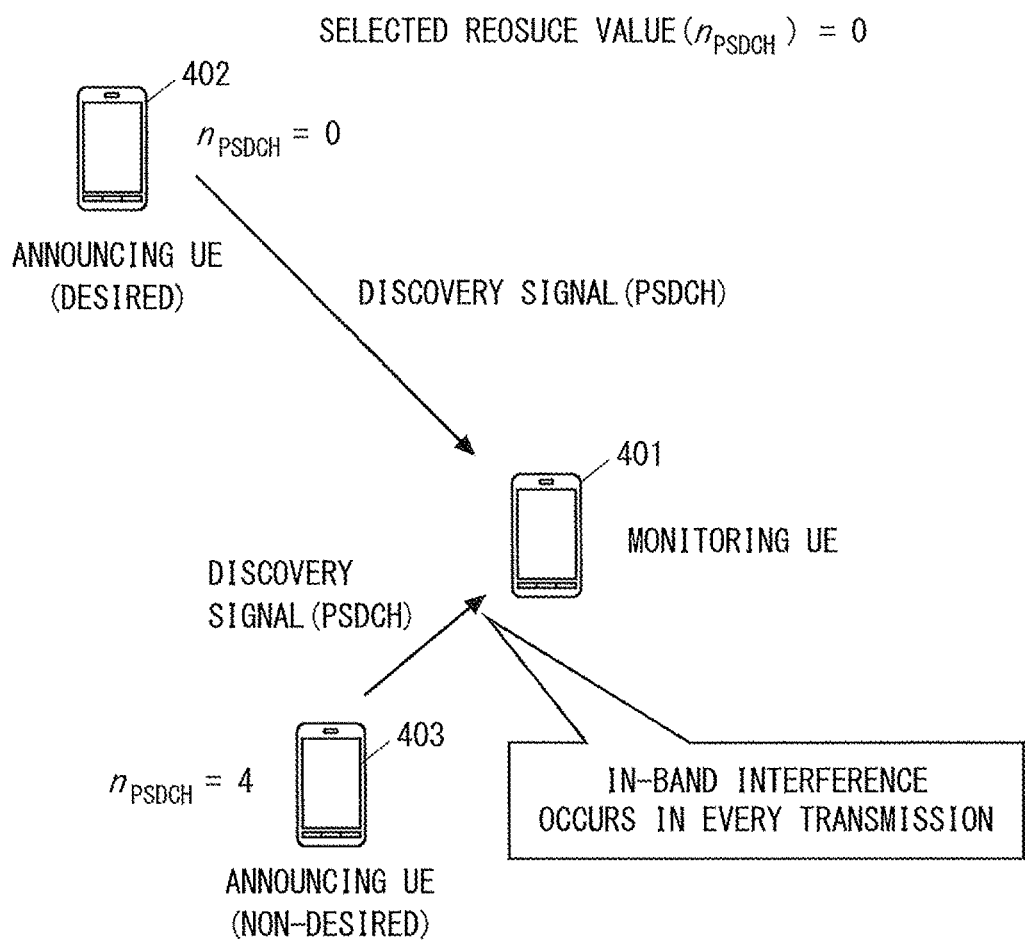
FIG. 4 shows an example of interference resulting from In-Band Emissions (IBE)
Figure 7:
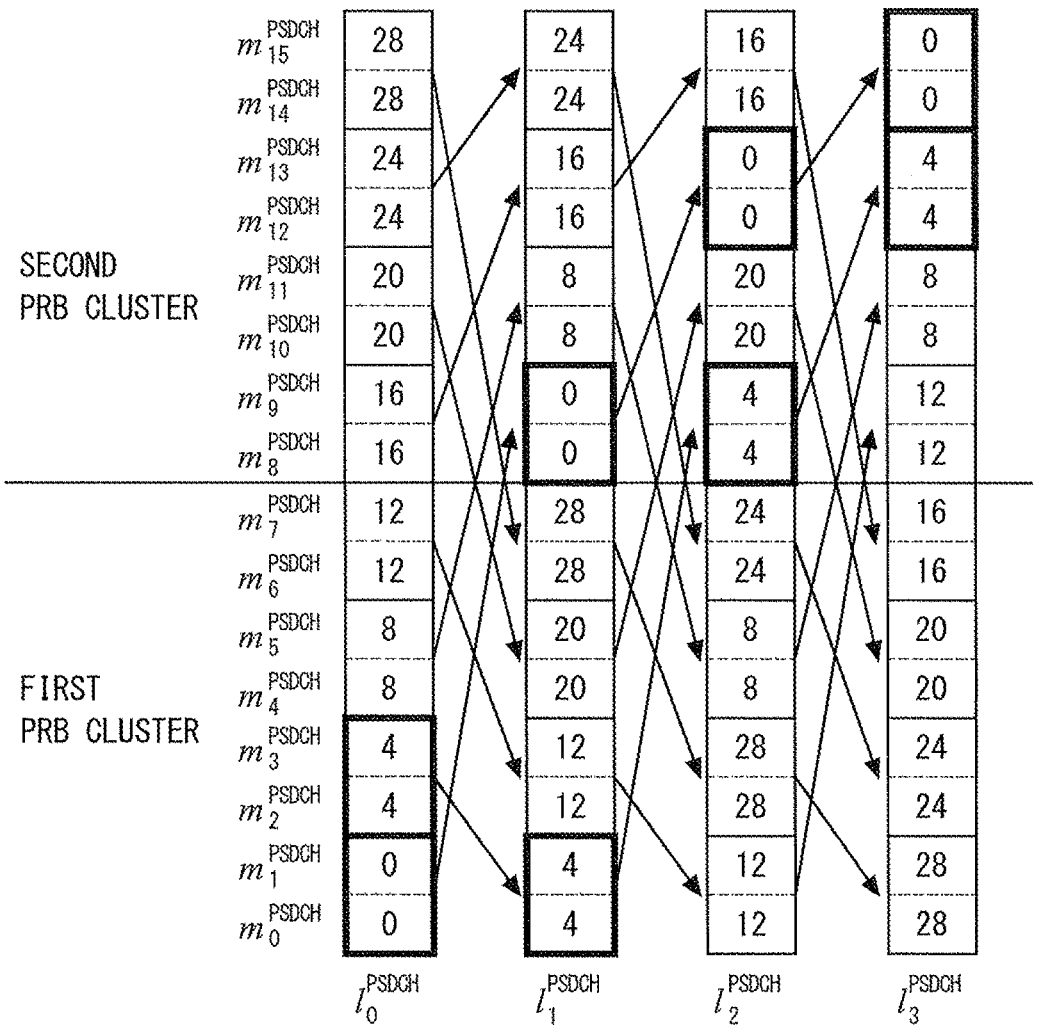
FIG. 7 shows an example of a selection of subframes and resource blocks for transmission of a discovery signal (PSDCH) by a radio terminal according to the first embodiment.

FIG. 7 shows an example of a resource block set selection according to the first example. Similarly to FIG. 3, FIG. 7 shows an example of radio resource allocation based on the Sidelink discovery Type 1 in which: the number ($L_{PSDCH}$) of subframes included in the discovery resource pool is 16 ($L_{PSDCH}=16$); the number ($M_{RB}^{SPDCH\_RP}$) of resource blocks (PRBs) is 16 ($M_{RB}^{SPDCH\_RP}=16$); and the number ($N_{SLD}^{TX}$) of PSDCH transmissions in one discovery period is 4 ($N_{SLD}^{TX}=4$). Note that FIG. 7 shows only the first four subframes among the 16 subframes in the resource pool. A numerical value in each cell shown in FIG. 7 indicates a value of the resource value $n_{PSDCH}$ that the UE 1 can select.

For example, when attention is paid to $n_{PSDCH}=0$ and $n_{PSDCH}=4$, although two resource block sets that are closest to each other are used in the transmission of the first subframe $l_0^{PSDCH}$, two resource block sets that are spaced apart from each other are used in the transmissions of the second and third subframes $l_1^{PSDCH}$ and $l_2^{PSDCH}$. Therefore, when a UE 1 that has selected $n_{PSDCH}=0$ is in proximity to another UE 1 that has selected $n_{PSDCH}=4$, it is possible to avoid a situation in which large In-band interference occurs in every one of the four PSDCH transmissions.

Further, as understood from FIG. 7, in the first example, the value of the frequency domain shift from the second resource block set used in the (j−1)th PSDCH transmission (1<j) to the first resource block set used in the j-th PSDCH transmission performed by the UE 1 is determined in a manner such that when the serial number (i.e., 0, 1, ..., ($m_{RB}^{PSDCH\_RP}/2-1$)) indicating the frequency domain position of the second resource block set is an odd number, the first resource block set is included in the first PRB cluster. Further, the value of the frequency domain shift is determined in a manner such that when the serial number (i.e., 0, 1, ..., ($M_{RB}^{PSDCH\_RP}/2-1$)) indicating the frequency domain position of the second resource block set is an even number, the first resource block set is included in the second PRB cluster.

For example, a UE 1 that has selected $n_{PSDCH}=0$ uses a resource block set in the first PRB cluster corresponding to the serial number $a_1=0$ in the first transmission, and then uses a resource block set in the second PRB cluster in the second transmission since $a_1$ is an even number "0". In contrast to this, a UE 1 that has selected $n_{PSDCH}=4$ uses a resource block set in the first PRB cluster corresponding to the serial number $a_1=1$ in the first transmission and then also uses a resource block set in the first PRB cluster in the second transmission since $a_1$ is an odd number "1".

Figure 1:
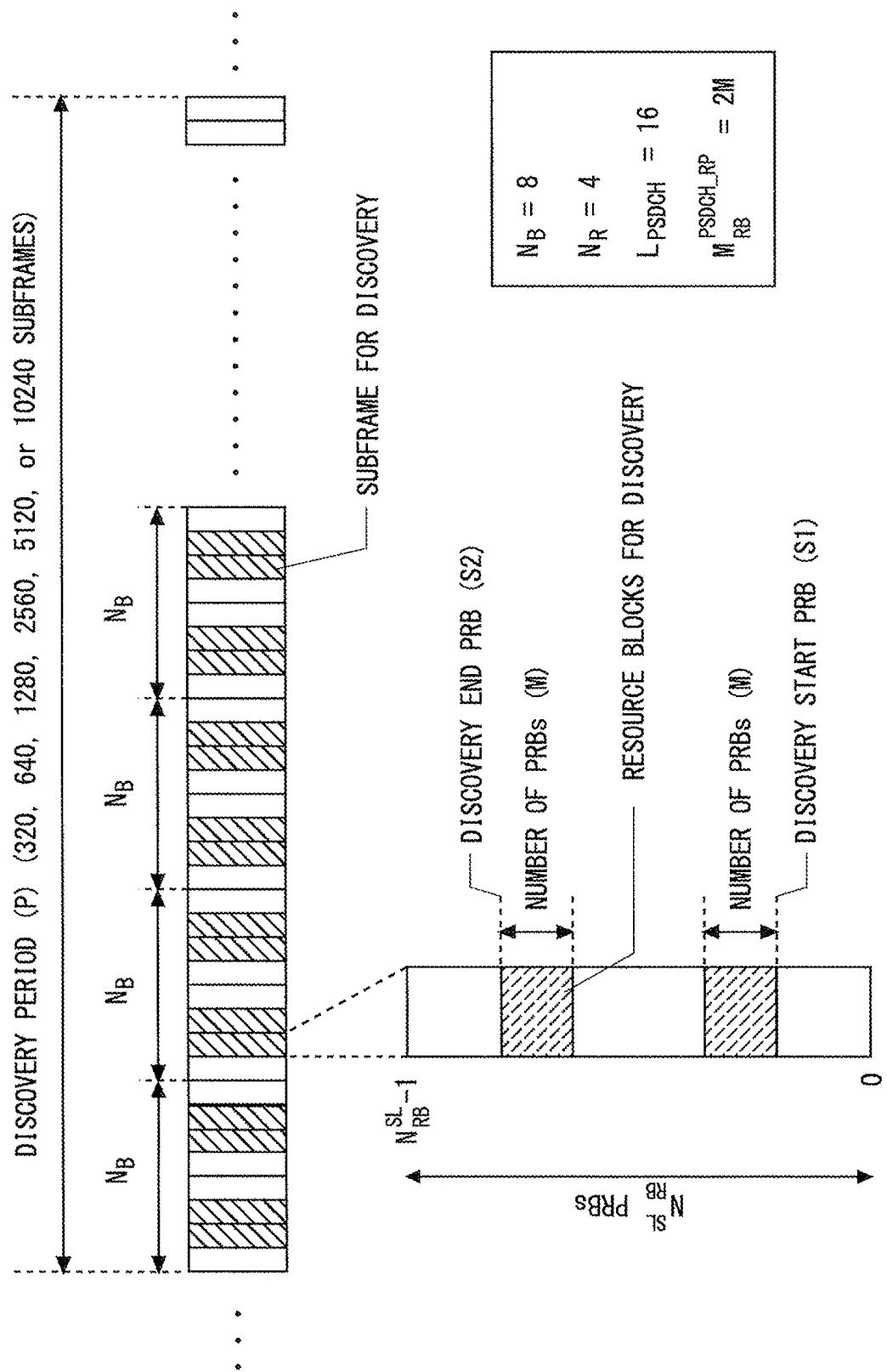
FIG. 1 shows an example of a relation between discovery periods (PSDCH periods) and time-frequency resources used for transmission of discovery signals (PSDCH)
Figure 2:
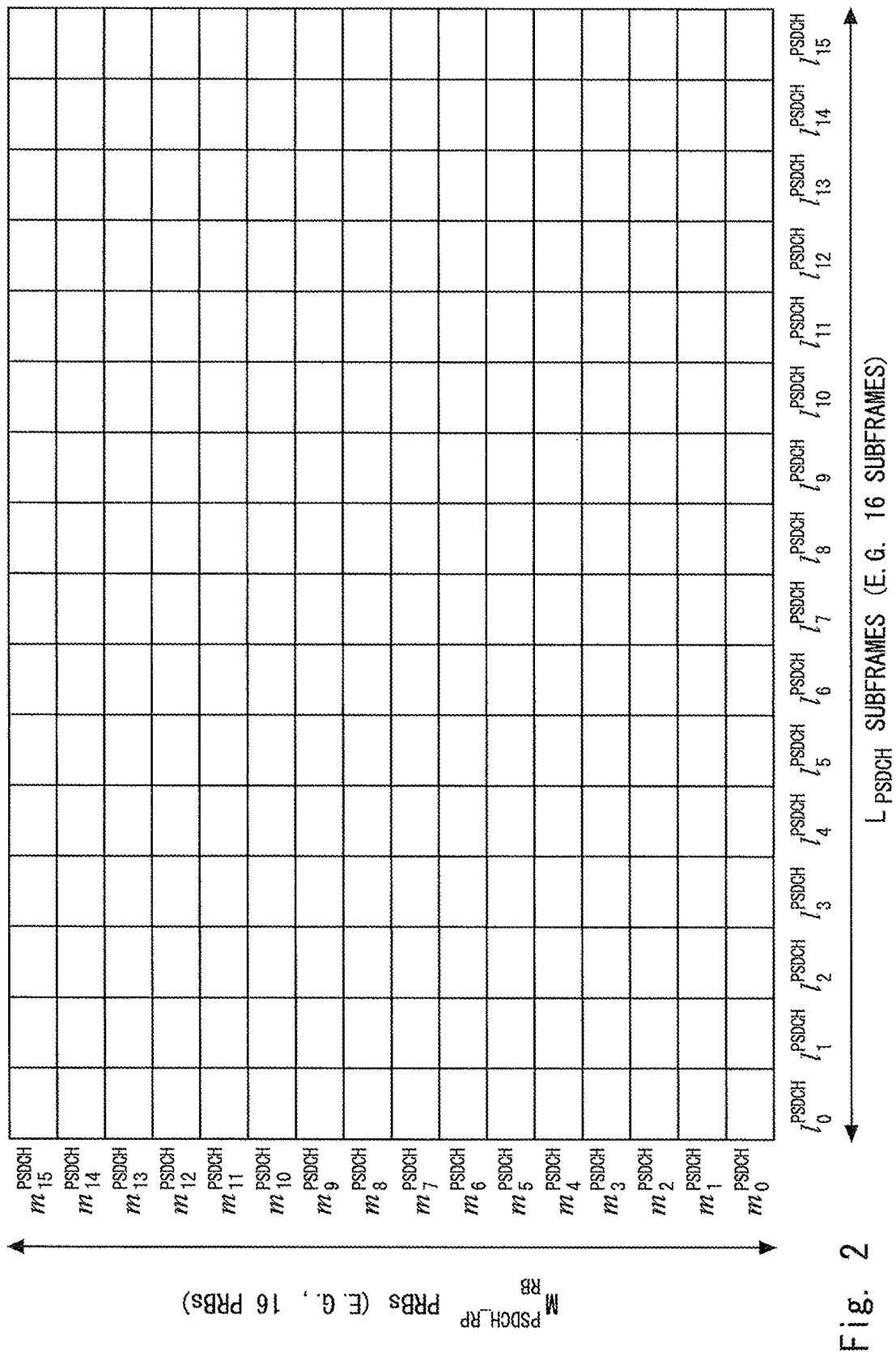
FIG. 2 shows an example of a discovery resource pool.

That is, according to the first example shown in FIG. 7, two UEs 1 that perform their first PSDCH transmissions by using two adjacent resource block sets within a PRB cluster can perform the second PSDCH transmissions by using resource block sets in mutually different PRB clusters. As described above with reference to FIGS. 1 and 2, it should be noted that although each of the first and second PRB clusters consists of contiguous resource blocks in the frequency domain, the first and second PRB clusters are not contiguous in the frequency domain. Therefore, according to the first example shown in FIG. 7, it is possible to reliably avoid situation in which large In-band interference occurs in every PSDCH transmissions performed by two UEs using the same set of subframes.

Next, a second example of the mapping between resource values $n_{PSDCH}$ and radio resources will be described. The second example has a relation opposite to that in the above-described first example. That is, in the second example, $a_j$ for determining a resource block set used in the j-th transmission is defined as follows:

$$a_j = \begin{cases} a_1 = \lfloor n_{PSDCH}/N_t \rfloor & \text{for } j = 1 \\ \begin{cases} (a_{j-1}-1)/2 + N_f & \text{when } a_{j-1} \text{ is an odd number} \\ a_{j-1}/2 & \text{when } a_{j-1} \text{ is an even number} \end{cases} & \text{for } 1 < j < N_{SLD}^{TX} \end{cases}$$

In the second example of the mapping between resource values $n_{PSDCH}$ and radio resources, when the value of $a_{j-1}$ is an odd number, $a_j$ is determined as a sum of a fixed shift value Nf and a value $(a_{j-1}-1)/2$ that is a value according to the value of $a_{j-1}$. Note that, $a_{j-1}$ indicates the frequency domain position of the resource block set (i.e., two contiguous resource blocks) used for the (j-1)th PSDCH transmission. Similarly, $a_j$ indicates the frequency domain position of the resource block set (i.e., two contiguous resource blocks) to be used for the j-th PSDCH transmission. In contrast to this, when the value of $a_{j-1}$ is an even number, $a_j$ is determined by a value $a_{j-1}/2$ that is a value according to the value of $a_{j-1}$.

Figure 8:
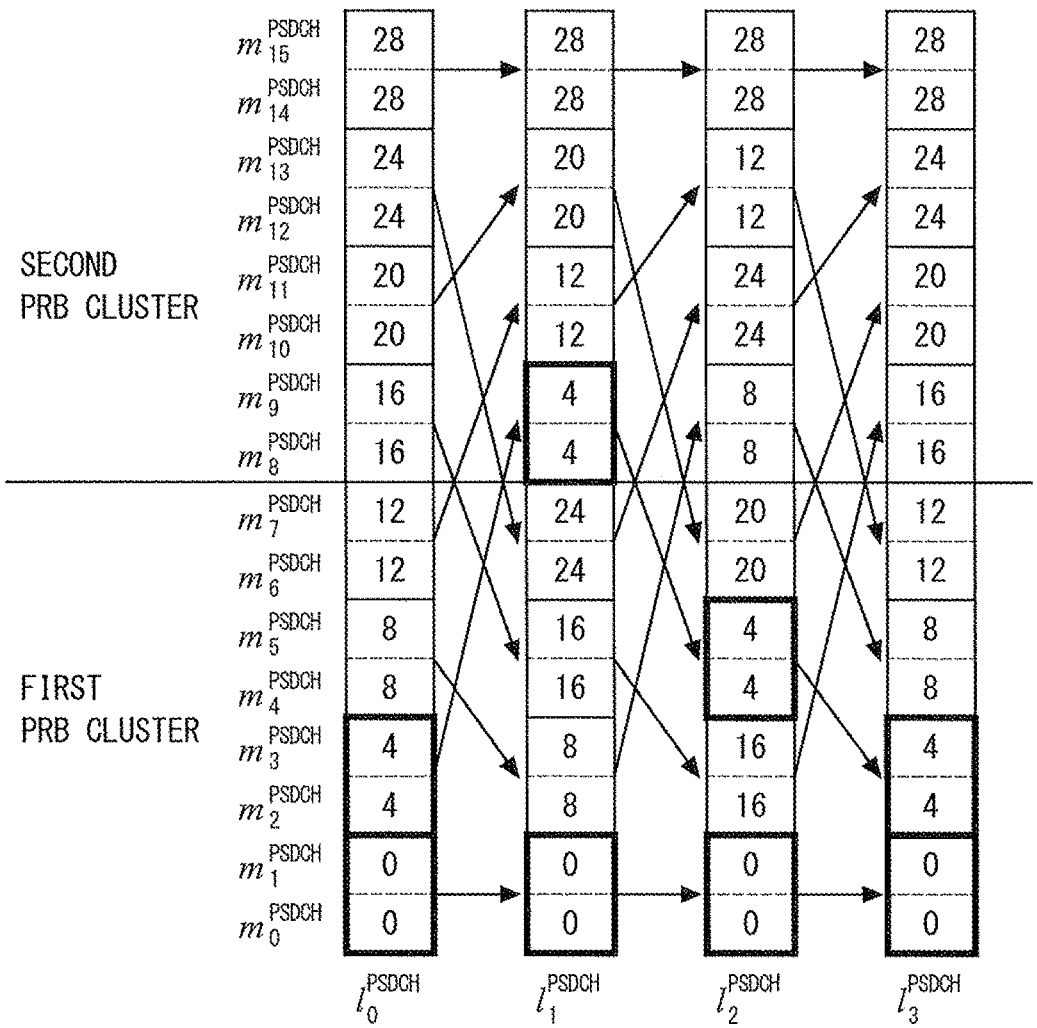
FIG. 8 shows another example of a selection of subframes and resource blocks for transmission of a discovery signal (PSDCH) by a radio terminal according to the first embodiment.

FIG. 8 shows an example of a resource block set selection according to the second example. Similarly to FIG. 3, FIG. 8 shows an example of radio resource allocation based on the Sidelink discovery Type 1 in which: the number ($L_{PSDCH}$) of subframes included in the discovery resource pool is 16 ($L_{PSDCH}=16$); the number ($M_{RB}^{PSDCH\_RP}$) of resource blocks (PRBs) is 16 ($M_{RB}^{PSDCH\_RP}=16$); and the number ($N_{SLD}^{TX}$) of PSDCH transmissions in one discovery period is 4 ($N_{SLD}^{TX}=4$). Note that similarly to FIG. 7, FIG. 8 shows only the first four subframes among the 16 subframes in the resource pool. A numerical value in each cell shown in FIG. 8 indicates a value of the resource value $n_{PSDCH}$ that the UE 1 can select.

As understood from FIG. 8, in the second example, the value of the frequency domain shift from the second resource block set used in the (j-1)th PSDCH transmission (1<j) to the first resource block set used in the j-th PSDCH transmission performed by the UE 1 is determined in a manner such that when the serial number (i.e., 0, 1, . . . , ($M_{RB}^{PSDCH\_RP}/2-1$)) indicating the frequency domain position of the second resource block set is an even number, the first resource block set is included in the first PRB cluster. Further, the value of the frequency domain shift is determined in a manner such that when the serial number (i.e., 0, 1, . . . , ($M_{RB}^{PSDCH\_RP}/2-1$)) indicating the frequency domain position of the second resource block set is an odd number, the first resource block set is included in the second PRB cluster.

According to this second example, advantageous effects similar to those in the above-described first example can be achieved.

The above-described first and second examples of the mapping between resource values $n_{PSDCH}$ and radio resources may be modified as appropriate. For example, in the above-described first and second examples, the value of the frequency domain shift between the j-th and (j-1)th transmissions may be determined by performing an intra-PRB cluster or inter-PRB cluster permutation, interleaving, or cyclic shifting of the frequency domain positions. These additional operations make it possible, for example, to perform a plurality of times PSDCH transmissions based on a given resource value $n_{PSDCH}$ by using a plurality of resource block sets that are distributed over a wider range of frequencies in the discovery resource pool and thereby to contribute to enhancing the frequency diversity.

Figure 9:
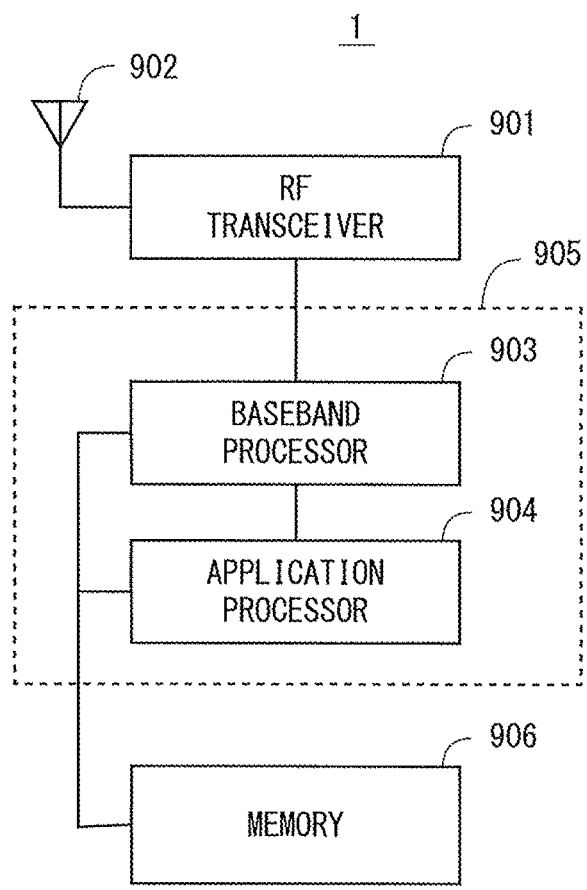
FIG. 9 is a block diagram showing an example of a radio terminal according to some embodiments.

Lastly, configuration examples of the UE 1 according to the above-described plurality of embodiments will be described. FIG. 9 is a block diagram showing a configuration example of the UE 1. A Radio Frequency (RF) transceiver 901 performs an analog RF signal processing to communicate with the eNB 2. The analog RF signal processing performed by the RF transceiver 901 includes a frequency up-conversion, a frequency down-conversion, and amplification. The RF transceiver 901 is coupled to an antenna 902 and a baseband processor 903. That is, the RF transceiver 901 receives modulated symbol data (or OFDM symbol data) from the baseband processor 903, generates a transmission RF signal, and supplies the generated transmission RF signal to the antenna 902. Further, the RF transceiver 901 generates a baseband reception signal based on a reception RF signal received by the antenna 902 and supplies the generated baseband reception signal to the baseband processor 903.

The baseband processor 903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 903 may include signal processing of Packet Data Convergence Protocol (PDCP) layer, Radio Link Control (RLC) layer, MAC layer, and PHY layer. Further, the control-plane processing performed by the baseband processor 903 may include processing of Non-Access Stratum (NAS) protocol, RRC protocol, and MAC CE.

The baseband processor 903 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 904 described in the following.

The application processor 904 may also be referred to as a CPU, an MPU, a microprocessor, or a processor core. The application processor 904 may include a plurality of processors (processor cores). The application processor 904 loads a system software program (Operating System (OS)) and various application programs (e.g., voice call application, WEB browser, mailer, camera operation application, and music player application) from a memory 906 or from another memory (not shown) and executes these programs, thereby providing various functions of the UE 1.

In some implementations, as represented by a dashed line (905) in FIG. 9, the baseband processor 903 and the application processor 904 may be integrated on a single chip. In other words, the baseband processor 903 and the application processor 904 may be implemented in a single System on Chip (SoC) device 905. A SoC device may be referred to as a system Large Scale Integration (LSI) or a chipset.

The memory 906 is a volatile memory, a nonvolatile memory, or a combination thereof. The memory 906 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 906 may include, for example, an external memory device that can be accessed by the baseband processor 903, the application processor 904, and the SoC 905. The memory 906 may include an internal memory device that is integrated in the baseband processor 903, the application processor 904, or the SoC 905. Further, the memory 906 may include a memory in a Universal Integrated Circuit Card (UICC).

The memory 906 may store software module (a computer program) including instructions and data to perform processing by the UE 1 described in the aforementioned plurality of embodiments. In some implementations, the baseband processor 903 or the application processor 904 may be configured to load the software module from the memory 906 and execute the loaded software module, thereby performing the processing of the UE 1 described by using the sequence diagrams and the flowcharts in the aforementioned embodiments.

As described above with reference to FIG. 9, each of the processors included in the UE 1 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

The above-described embodiments have been described mainly for the sidelink discovery Type 1 (i.e., the autonomous resource selection). However, these embodiments may be applied to the sidelink discovery Type 2B (i.e., the scheduled resource selection). As already described, in the sidelink discovery Type 2B, the eNB 2 allocates radio resources for transmission of a discovery signal (PSDCH) to the UE 1 in a semi-persistent manner. Specifically, the UE 1 may select a resource block set for the first transmission in each discovery period according to one or more parameter values set by the eNB 2. Then, resource block sets for second and subsequent transmissions in each discovery period may be determined according to the above-described embodiment.

Further, the above-described embodiments may also be applied to the sidelink discovery Type 2A, though it is not specified in 3GPP Release 12. As already described, in the sidelink discovery Type 2A, the eNB 2 dynamically allocates radio resources for transmission of a discovery signal (PSDCH) to the UE 1 in each discovery period (PSDCH period). Specifically, the UE 1 may select a resource block set for the first transmission in each discovery period according to one or more parameter values set by the eNB 2. Then, resource block sets for second and subsequent transmissions in each discovery period may be determined according to the above-described embodiment.

The above-described embodiments are not limited to the LTE-Advanced and its improvements, but may be applied to D2D communication in other mobile communication networks or systems.

Further, the above-described embodiments are merely examples of applications of the technical ideas obtained by the inventor. These technical ideas are not limited to the above-described embodiments and various modifications can be made thereto.

This application is based upon and claims the benefit of priority from Japanese patent application No. 2015-130460, filed on Jun. 29, 2015, the disclosure of which is incorporated herein in its entirety by reference.

REFERENCE SIGNS LIST

1 UE
2 eNB
901 RADIO FREQUENCY (RF) TRANSCEIVER
903 BASEBAND PROCESSOR
904 APPLICATION PROCESSOR
906 MEMORY

The invention claimed is:

1. A method for radio communication performed in a radio terminal, the method comprising:
  selecting, from a resource pool including L subframes and M frequency domain resource blocks in a discovery period, $N^{TX}$ subframes and $N^{TX}$ sets of resource blocks to be used in $N^{TX}$ times of transmission of a discovery signal in the discovery period based on a first value n1 of a resource value autonomously selected by the radio terminal or a first value n1 of a parameter received from a base station, wherein each set of the $N^{TX}$ sets of resource blocks is used in transmission of the discovery signal in a respective one of the $N^{TX}$ subframes, and wherein with regard to the $N^{TX}$ sets of resource blocks, a value of a frequency domain shift from a second resource block set used in (j−1)th transmission to a first resource block set used in j-th transmission of the discovery signal in the discovery period depends on at least one of the first value n1 and a frequency domain position of the second resource block set in the resource pool, where j is an integer equal to or greater than 2.

2. The method according to claim 1, wherein the value of the frequency domain shift depends on a value of a serial number indicating the frequency domain position of the second resource block set.

3. The method according to claim 1, wherein the value of the frequency domain shift changes depending on whether a serial number indicating the frequency domain position of the second resource block set is an odd number or an even number.

4. The method according to claim 3, wherein
the M frequency domain resource blocks include a plurality of clusters that are not contiguous in a frequency domain, and
each of the plurality of clusters consists of contiguous resource blocks in the frequency domain,
wherein when the serial number indicating the frequency domain position of the second resource block set is an odd number, the value of the frequency domain shift is determined so that the first resource block set is included in a first cluster among the plurality of clusters, and
wherein when the serial number indicating the frequency domain position of the second resource block set is an even number, the value of the frequency domain shift is determined so that the first resource block set is included in a second cluster among the plurality of clusters.

5. The method according to claim 1, wherein
the M frequency domain resource blocks include a plurality of clusters that are not contiguous in a frequency domain, and
each of the plurality of clusters consists of contiguous resource blocks in the frequency domain,
wherein the value of the frequency domain shift is determined by performing an intra-cluster or inter-cluster permutation, interleaving, or cyclic shifting of frequency domain positions in the M frequency domain resource blocks.

6. The method according to claim 1, wherein the $N^{TX}$ subframes selected based on the first value n1 are the same as $N^{TX}$ subframes selected based on a second value n2 of the resource value or the parameter.

7. The method according to claim 1, wherein each set of the $N^{TX}$ sets of resource blocks consists of two contiguous resource blocks.

8. A radio terminal comprising:
at least one radio transceiver; and
at least one processor configured to perform cellular communication with a cellular network and device-to-device communication with another radio terminal by using the at least one radio transceiver, wherein
the at least one processor is further configured to select, from a resource pool including L subframes and M frequency domain resource blocks in a discovery period, $N^{TX}$ subframes and $N^{TX}$ sets of resource blocks to be used in $N^{TX}$ times of transmission of a discovery signal in the discovery period based on a first value n1 of a resource value autonomously selected by the radio terminal or a first value n1 of a parameter received from a base station, wherein each set of the $N^{TX}$ sets of resource blocks is used in transmission of the discovery signal in a respective one of the $N^{TX}$ subframes, and wherein with regard to the $N^{TX}$ sets of resource blocks, a value of a frequency domain shift from a second resource block set used in (j−1)th transmission to a first resource block set used in j-th transmission of the discovery signal in the discovery period depends on at least one of the first value n1 and a frequency domain position of the second resource block set in the resource pool, where j is an integer equal to or greater than 2.

9. The radio terminal according to claim 8, wherein the value of the frequency domain shift depends on a value of a serial number indicating the frequency domain position of the second resource block set.

10. The radio terminal according to claim 8, wherein the value of the frequency domain shift changes depending on whether a serial number indicating the frequency domain position of the second resource block set is an odd number or an even number.

11. The radio terminal according to claim 10, wherein
the M frequency domain resource blocks include a plurality of clusters that are not contiguous in a frequency domain, and
each of the plurality of clusters consists of contiguous resource blocks in the frequency domain,
wherein when the serial number indicating the frequency domain position of the second resource block set is an odd number, the value of the frequency domain shift is determined so that the first resource block set is included in a first cluster among the plurality of clusters, and
wherein when the serial number indicating the frequency domain position of the second resource block set is an even number, the value of the frequency domain shift is determined so that the first resource block set is included in a second cluster among the plurality of clusters.

12. The radio terminal according to claim 8, wherein
the M frequency domain resource blocks include a plurality of clusters that are not contiguous in a frequency domain, and
each of the plurality of clusters consists of contiguous resource blocks in the frequency domain,
wherein the value of the frequency domain shift is determined by performing an intra-cluster or inter-cluster permutation, interleaving, or cyclic shifting of frequency domain positions in the M frequency domain resource blocks.

13. The radio terminal according to claim 8, wherein the $N^{TX}$ subframes selected based on the first value n1 are the same as $N^{TX}$ subframes selected based on a second value n2 of the resource value or the parameter.

14. The radio terminal according to claim 8, wherein each set of the $N^{TX}$ sets of resource blocks consists of two contiguous resource blocks.

15. A non-transitory computer readable medium storing a program for causing a computer to perform a radio communication method in a radio terminal, wherein the method comprises selecting, from a resource pool including L subframes and M frequency domain resource blocks in a discovery period, $N^{TX}$ subframes and $N^{TX}$ sets of resource blocks to be used in $N^{TX}$ times of transmission of a discovery signal in the discovery period based on a first value n1 of a resource value autonomously selected by the radio terminal or a first value n1 of a parameter received from a base station, wherein each set of the $N^{TX}$ sets of resource blocks is used in transmission of the discovery signal in a respective one of the $N^{TX}$ subframes, and wherein with regard to the $N^{TX}$ sets of resource blocks, a value of a frequency domain shift from a second resource block set used in (j−1)th transmission to a first resource block set used in j-th transmission of the discovery signal in the discovery period depends on at least one of the first value n1 and a frequency domain position of the second resource block set in the resource pool, where j is an integer equal to or greater than 2.

16. The non-transitory computer readable medium according to claim 15, wherein the value of the frequency domain shift depends on a value of a serial number indicating the frequency domain position of the second resource block set.

17. The non-transitory computer readable medium according to claim 15, wherein the value of the frequency domain shift changes depending on whether a serial number indicating the frequency domain position of the second resource block set is an odd number or an even number.

18. The non-transitory computer readable medium according to claim 17, wherein the M frequency domain resource blocks include a plurality of clusters that are not contiguous in a frequency domain, and each of the plurality of clusters consists of contiguous resource blocks in the frequency domain, wherein when the serial number indicating the frequency domain position of the second resource block set is an odd number, the value of the frequency domain shift is determined so that the first resource block set is included in a first cluster among the plurality of clusters, and wherein when the serial number indicating the frequency domain position of the second resource block set is an even number, the value of the frequency domain shift is determined so that the first resource block set is included in a second cluster among the plurality of clusters.

19. The non-transitory computer readable medium according to claim 15, wherein the M frequency domain resource blocks include a plurality of clusters that are not contiguous in a frequency domain, and each of the plurality of clusters consists of contiguous resource blocks in the frequency domain, wherein the value of the frequency domain shift is determined by performing an intra-cluster or inter-cluster permutation, interleaving, or cyclic shifting of frequency domain positions in the M frequency domain resource blocks.

20. The non-transitory computer readable medium according to claim 15, wherein the $N^{TX}$ subframes selected based on the first value n1 are the same as $N^{TX}$ subframes selected based on a second value n2 of the resource value or the parameter.

* * * * *